(12) United States Patent
Li

(10) Patent No.: US 10,152,054 B2
(45) Date of Patent: Dec. 11, 2018

(54) RECEIVING METHOD, SYSTEM AND DEVICE FOR ON-VEHICLE LOGISTICS

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 0 days.

(21) Appl. No.: 15/313,591

(22) PCT Filed: Mar. 5, 2015

(86) PCT No.: PCT/CN2015/073716
§ 371 (c)(1),
(2) Date: Nov. 23, 2016

(87) PCT Pub. No.: WO2015/180518
PCT Pub. Date: Dec. 3, 2015

(65) Prior Publication Data
US 2017/0199522 A1  Jul. 13, 2017

(30) Foreign Application Priority Data

May 30, 2014  (CN) .......................... 2014 1 0242463

(51) Int. Cl.
*G05D 1/00* (2006.01)
*G07C 9/00* (2006.01)
*G07C 5/08* (2006.01)

(52) U.S. Cl.
CPC ......... *G05D 1/0033* (2013.01); *G07C 5/0866* (2013.01); *G07C 9/00896* (2013.01)

(58) Field of Classification Search
CPC ........................... G05D 1/0033; G07C 5/0866
(Continued)

(56) References Cited

U.S. PATENT DOCUMENTS 8,346,432 B2 * 1/2013 Van Wiemeersch ... G08C 17/02
340/426.13
8,558,690 B2 * 10/2013 Kleve .................... H04M 11/04
340/425.5
(Continued)

FOREIGN PATENT DOCUMENTS

CN  101848433 A  9/2010
CN  102300016 A  12/2011
(Continued)

OTHER PUBLICATIONS

International Search Report and Written Opinion for Application No. PCT/CN2015/073716 dated Jun. 8, 2015.

*Primary Examiner* — Tyler J Lee
(74) *Attorney, Agent, or Firm* — Alston & Bird LLP

(57) ABSTRACT

The present invention provides a receiving method, system and device for on-vehicle logistics. The method includes: receiving a first control signal from a remote terminal, and activating a camera pointing to a designated space; sending video information of the designated space to the remote terminal; receiving a second control signal from the remote terminal, and opening a predetermined space of a vehicle; and receiving a third control signal from the remote terminal, and locking the predetermined space. According to the receiving method for on-vehicle logistics of the present invention, as the vehicle is used as the receiving place for receiving articles delivered by the deliveryman, insecure factors caused when the deliveryman directly enters houses
(Continued)

to deliver the articles are avoided, and the phenomenon that the articles cannot be received because recipients are not at receiving addresses can also be avoided.

6 Claims, 2 Drawing Sheets

(58) Field of Classification Search
 USPC .......................................................... 701/2
 See application file for complete search history.

(56) References Cited

U.S. PATENT DOCUMENTS

| | | | | |
|---|---|---|---|---|
| 2006/0149431 | A1* | 7/2006 | Wilson | B60R 25/2009 701/2 |
| 2006/0293802 | A1* | 12/2006 | Kitao | B60R 25/00 701/2 |
| 2007/0109107 | A1 | 5/2007 | Liston | |
| 2007/0156317 | A1* | 7/2007 | Breed | B60N 2/002 701/45 |
| 2008/0114501 | A1* | 5/2008 | Wu | B60R 25/045 701/2 |
| 2008/0204556 | A1* | 8/2008 | de Miranda | B60R 25/102 348/148 |
| 2009/0273438 | A1* | 11/2009 | Sultan | G07C 9/00103 340/5.7 |
| 2010/0275122 | A1* | 10/2010 | Buxton | G06F 1/1626 715/728 |
| 2011/0227712 | A1 | 9/2011 | Atteck | |
| 2014/0254896 | A1* | 9/2014 | Zhou | B25J 9/0006 382/124 |
| 2015/0310381 | A1* | 10/2015 | Lyman | G06Q 10/083 705/330 |

FOREIGN PATENT DOCUMENTS

| | | |
|---|---|---|
| CN | 202141936 U | 2/2012 |
| CN | 104021514 A | 9/2014 |

* cited by examiner

RECEIVING METHOD, SYSTEM AND DEVICE FOR ON-VEHICLE LOGISTICS

CROSS REFERENCE TO RELATED APPLICATION

This application claims priority to and the benefit of PCT/CN2015/073716, filed Mar. 5, 2015, which claims priority and the benefit of Chinese Patent Application Serial No. 201410242463.9, filed with the State Intellectual Property Office of P. R. China on May 30, 2014, the entire content of which is incorporated herein by reference in its entirety.

FIELD OF THE INVENTION

The present invention relates to the field of logistics, and in particular, to a receiving method, system and device for on-vehicle logistics, which is used for handing over an article to be delivered between a deliveryman and a designated vehicle.

BACKGROUND OF THE INVENTION

At present, shopping online has become a consumption habit of people, and the express delivery industry resulting therefrom is also becoming increasingly popular. An article ordered online is usually sent by a deliveryman directly to an address left by a recipient and is handed over between the both parties face to face. In this way, the recipient may check the article on the spot, and a dispute may be easily handled. However, in some cases, when the recipient is not at the receiving site or is in a confidential entity, a deliveryman cannot deliver the article to the recipient face to face, and thus the delivery of the article will be postponed or the article may be received and signed by others for the recipient, which is apt to result the following disputes: for example, the final delivery time of the article exceeds the time limit for returning or exchange the article, or the article is not checked when being receiving by the others and thus a defective article might be received, etc.

In addition, when the address left by the recipient for delivering the article is the residence of the recipient, some potential safety hazards will be caused. The deliveryman will obtain the internal information of the residence of the recipient easily. When only the elderly or children are in the residence for receiving the article, the weakness of the residence will be exposed to the strange deliveryman, thereby bringing potential safety hazards, for example, burglary, robbery and other phenomena in the name of delivering an article are liable to happen.

SUMMARY OF THE INVENTION

One object of the present invention is to provide a method for handing over express articles by a vehicle.

A further object of the present invention is to provide a receiving device for on-vehicle logistics, which enables a recipient to clearly learn the handover process of express articles.

Particularly, the present invention provides a receiving method for on-vehicle logistics, including:
receiving a first control signal from a remote terminal, and activating a camera pointing to a designated space;
sending video information of the designated space to the remote terminal;
receiving a second control signal from the remote terminal, and opening a predetermined space of a vehicle; and
receiving a third control signal from the remote terminal, and locking the predetermined space.

Further, before the step of receiving the first control signal from the remote terminal, the receiving method of the present invention further includes:
receiving an acousto-optic control signal from the remote terminal to emit flicker and/or sound by the vehicle.

Further, before the step of receiving the acousto-optic control signal from the remote terminal, the receiving method of the present invention further includes: sending GPS positioning information of the vehicle to the remote terminal.

Further, the receiving method of the present invention further includes:
automatically activating the camera according to searched positioning information of a deliveryman; and
locking the predetermined space by an external close operation.

Further, the camera includes:
a first camera used for identifying the deliveryman; and
a second camera arranged in the predetermined space and used for identifying articles.

Further, the present invention provides a receiving device for on-vehicle logistics, including:
a network communication module configured to communicate with a remote terminal through a wireless network;
a camera configured to be activated according to a first control signal from the remote terminal, shoot video information of a designated space, and send the video information to the remote terminal; and
a vehicle control unit configured to open a predetermined space of a vehicle according to a second control signal from the remote terminal, and lock the predetermined space according to a third control signal from the remote terminal.

Further, the camera includes:
a first camera used for identifying the deliveryman; and
a second camera arranged in the predetermined space and used for identifying articles.

Further, the predetermined space is a trunk of the vehicle.

Further, the trunk of the vehicle has a first space close to the interior of the vehicle and a second space close to the tail of the vehicle, the first space and the second space are isolated from each other, and the predetermined space is the second space.

Further, the present invention provides a receiving system for on-vehicle logistics, including:
a video activating module configured to receive a first control signal from a remote terminal, and activate a camera pointing to a designated space;
a video sending module configured to send video information of the designated space to the remote terminal;
a space opening module configured to receive a second control signal from the remote terminal, and open a predetermined space of a vehicle; and
a space locking module configured to receive a third control signal from the remote terminal, and lock the predetermined space.

According to the receiving method for on-vehicle logistics of the present invention, as the vehicle is used as the receiving place for receiving the article delivered by the deliveryman, insecure factors caused when the deliveryman directly enters the house to deliver the article are avoided, and the phenomenon that the article cannot be received because the recipient is not at the receiving address may also be avoided.

Further, with the receiving device for on-vehicle logistics of the present invention, the article may be received when the recipient is not on the spot of receiving the express article, and the recipient may monitor the whole process of receiving the article.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary, rather than a restrictive manner with reference to the drawings. Identical reference signs in the drawings denote identical or similar components or parts. Those skilled in the art should understand that these drawings are not necessarily drawn to scale. In the drawings.

DETAILED DESCRIPTION OF THE EMBODIMENTS

Figure 1:
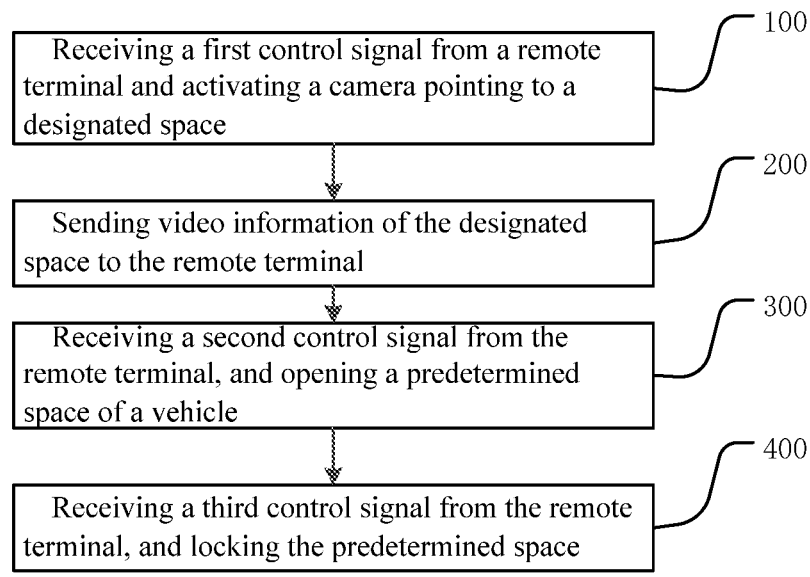
FIG. 1 is a schematic flow diagram of a receiving method for on-vehicle logistics according to one embodiment of the present invention.

FIG. 1 is a schematic flow diagram of a receiving method for on-vehicle logistics according to one embodiment of the present invention. According to the method of the present invention, an article delivered by a deliveryman is received by a vehicle of a recipient or by a vehicle that the recipient has a right to use. As shown in FIG. 1, the method may generally include the following steps.

Step 100: receiving a first control signal from a remote terminal, and activating a camera that is pointing to a designated space.

The remote terminal may be a mobile phone of the recipient, or a mobile phone of the deliveryman which is authorized by the recipient to be able to use a specific function. The designated space may be a space extended along a certain direction of the vehicle or a certain space in the vehicle, and may also mean the certain direction of the vehicle and the certain space in the vehicle.

In this step, after receiving the information indicating that the deliveryman has arrived at a vehicle position specified in a shipping address, the mobile phone of the recipient sends to the vehicle a signal for activating the camera. After being activated, the camera scans the surrounding of the vehicle to record the peripheral information of the vehicle.

Particularly, in order to find the designated vehicle, the vehicle may send its GPS positioning information to the remote terminal. The remote terminal herein may be the mobile phone controlled by the recipient, and according to the GPS positioning information, the mobile phone of the recipient sends description information indicating the position of the vehicle to the mobile phone of the deliveryman. Alternatively, the vehicle may forward the GPS positioning information directly to the mobile phone of the deliveryman. Or, the mobile phone of the deliveryman may directly obtain the GPS positioning information under the authorization of the mobile phone of the recipient, thereby allowing the deliveryman himself to find the vehicle.

Further, in order to indicate the position of the vehicle, the vehicle may receive an acousto-optic control signal from the remote terminal to let the vehicle to emit flicker and/or sound. The remote terminal herein may be the mobile phone controlled by the recipient, or may be the mobile phone controlled by the deliveryman. The remote terminal controls a specified lamp of the vehicle to flicker and/or a horn of the vehicle to honk, so as to facilitate the deliveryman finding the designated vehicle for handing over the article more quickly.

Step 200: sending video information of the designated space to the remote terminal. The remote terminal may be the mobile phone controlled by the recipient. The designated space may be a space that extends along a certain direction of the vehicle. The video information may refer to all information recorded along the certain direction in a certain duration of time, and the information should contain information that can indicate whether an object to be interacted has appeared.

In this step, the camera records the status of the surrounding of the vehicle and synchronously sends the video information to the mobile phone of the recipient. The remote terminal may always learn any change of the surrounding of the vehicle by means of the video information.

Step 300: receiving a second control signal from the remote terminal, and opening a predetermined space of the vehicle.

The remote terminal may be the mobile phone controlled by the recipient. The predetermined space may be a specific space within the vehicle, for example, a trunk of the vehicle, or a seat space of the vehicle, or a specific space arranged at the vehicle and being special for receiving the article. The predetermined space is used for placing the article.

In this step, when determining that the object to be interacted conforms to predetermined requirements according to the video information from the camera, the remote terminal sends to the vehicle the signal of opening the predetermined space for receiving the article at the vehicle, and the predetermined space serves as an interactive place with the outside.

Particularly, the camera may include a first camera used for identifying objects in the designated space, and a second camera arranged in the predetermined space and used for identifying the article. The first camera may be arranged at a position of the vehicle with a wider view, for example, the first camera may be arranged at the rear window of the vehicle and face to the tail of the vehicle in order to find the object to be interacted in time. The second camera may be installed in the predetermined space to record the change process in the predetermined space, so that the remote terminal can learn any change in the predetermined space in real time and confirm whether the change conforms to an intended purpose. The second camera may be activated with the opening of the predetermined space, and stop working with the locking of the predetermined space.

Step 400: receiving a third control signal from the remote terminal, and locking the predetermined space.

The remote terminal herein may be the mobile phone controlled by the recipient, and the predetermined space may be a space at the vehicle for interacting with the outside and placing the article.

In this step, the remote terminal determines that the change in the predetermined space has conformed to the intended purpose by means of the video information of the camera, and then may send a signal to the vehicle to lock the predetermined space again. The signal may simultaneously include an instruction of turning off the camera (including the first camera and the second camera). The change in the predetermined space may include a certain feature for identifying the change through the second camera, or a further change derived from the change, so that the remote terminal may learn each possible step of the change.

Particularly, as to the locking of the predetermined space, the predetermined space may be locked by an external close operation. For example, the predetermined space may be closed by the interactive object. The remote terminal may confirm that the predetermined space has been locked according to a signal returned from the camera or the vehicle.

The execution process of the aforementioned steps of the present invention will be illustrated below by a specific example:

The vehicle is used as a receiving place designated by the recipient. After receiving an instruction of activating the camera sent by the recipient from the mobile phone (the remote terminal), the vehicle activates the camera to scan toward a certain direction (e.g., the tail of the vehicle) or the surrounding of the vehicle. By means of the video information of the camera received by the mobile phone, the recipient may confirm whether the expected deliveryman has arrived at the vehicle. The vehicle may prompt the deliveryman with its current position by the controlled light or horn. Alternatively, the deliveryman may obtain the GPS positioning information of the vehicle, thereby finding the vehicle.

After the recipient confirms that the deliveryman has arrived at the vehicle, the mobile phone of the recipient sends to the vehicle a signal of opening the predetermined space (e.g., the trunk) for receiving the article delivered by the deliveryman. The deliveryman places the article into the predetermined space, and meanwhile, the second camera located in the predetermined space records the process of placing the article in real time and transmits it to the mobile phone of the recipient. By means of the mobile phone, the recipient confirms that the article has been placed, and locks the predetermined space, thereby completing the process of receiving the article this time.

In process of placing the article, the mobile phone of the recipient may obtain the text information of the article through the second camera to determine whether the information of the recipient is accurate, or may determine the integrity of the article by asking the deliveryman to open the package.

According to the method, the vehicle is controlled to execute corresponding actions according to the information sent by the remote terminal, and the recipient may remotely monitor the delivery of the article delivered by the deliveryman, thereby improving the security of receiving the express article by the recipient while guaranteeing the successful delivery of the article.

Figure 2:
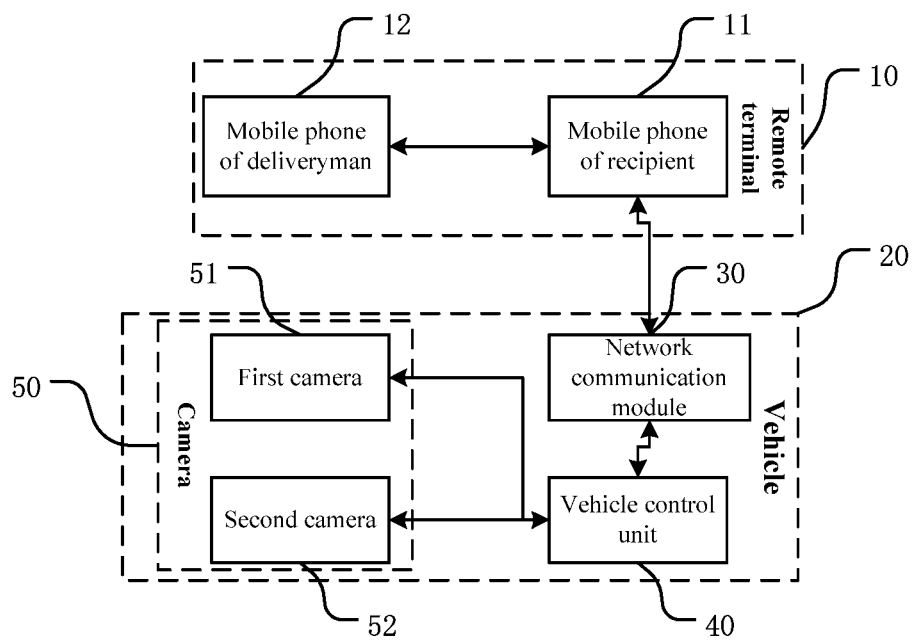
FIG. 2 is a schematic structural diagram of a receiving device for on-vehicle logistics according to one embodiment of the present invention.

FIG. 2 is a schematic structural diagram of a receiving device for on-vehicle logistics according to one embodiment of the present invention. The receiving device for on-vehicle logistics of the present invention generally includes: a network communication module 30 configured to communicate with a remote terminal 10 through a wireless network; a camera 50 configured to be activated according to a first control signal from the remote terminal 10, shoot video information of a designated space, and send the video information to the remote terminal 10; and a vehicle control unit 40 configured to open a predetermined space of a vehicle according to a second control signal from the remote terminal 10, and lock the predetermined space according to a third control signal from the remote terminal 10.

The network communication module 30 establishes a real-time contact between the remote terminal 10 and the vehicle 20 serving as a receiving place. The wireless network may be a mobile communication network and/or a WIFI network. The remote terminal 10 may be a mobile phone 11 of a recipient or a mobile phone 12 of a deliveryman.

The camera 50 is installed at the vehicle 20 and used for monitoring an article handover process through the video information. The first control signal is sent when the mobile phone 11 of the recipient receives a request signal sent by the mobile phone 12 of the deliveryman. The network communication module 30 can not only receive the signal from the remote terminal 10, but also can send the video information of the camera 50 to the remote terminal 10.

To conveniently place articles with different volumes, the predetermined space of the vehicle may be the trunk of the vehicle 20, or a seat space of the vehicle 20, or a specific space arranged at the vehicle 20 special for receiving articles. The specific space may be composed of a first space and a second space in the trunk, which are isolated from each other, wherein the first space is close to the interior of the vehicle, and the second space is close to the tail of the vehicle. Preferably, the entire trunk of the vehicle 20 is used as the predetermined space for receiving the articles.

To monitoring the handover processes of the article in different stages, the camera 50 may include a first camera 51 used for identifying the deliveryman, and a second camera 52 arranged in the predetermined space and used for identifying the article. The first camera 51 may be arranged at a position of the vehicle 20 with a wider view, so as to find the approaching of the deliveryman in time. The second camera 52 may be installed in the predetermined space for placing the article to be received, so as to record the process that the deliveryman places the article into the predetermined space.

The vehicle control unit 40 may be only used for handling the article handover process, so the receiving device of the present invention may be used as an independent equipment that is separated from the vehicle control system. The second control signal is sent by the mobile phone 11 of the recipient after the video information shot by the first camera 51 contains information capable of identifying the deliveryman. The third control signal is sent by the mobile phone 11 of the recipient after the video information shot by the second camera 52 contains information indicating that the article has been placed in the predetermined space.

The working process of the receiving device of the present invention will be illustrated below by a specific example:

After the mobile phone 12 of the deliveryman contacts the mobile phone 11 of the recipient, the mobile phone 11 of the recipient provides the mobile phone 12 of the deliveryman with information indicating the location of the vehicle 20 for receiving the article. The mobile phone 11 of the recipient sends information of activating the first camera 51 at the vehicle 20 to the network communication module 30 of the vehicle 20. The vehicle control unit 40 activates the first camera 51 according to the instruction, records the surrounding of the vehicle 20, and meanwhile sends the recorded video information to the mobile phone 11 of the recipient through the network communication module 30 in real time.

When the recipient determines by means the video information in the mobile phone 11 that the deliveryman has arrived at the vehicle 20, the mobile phone 11 of the recipient sends an instruction of opening the trunk of the vehicle (other spaces in the vehicle are also possible) to the network communication module 30 of the vehicle 20, and the vehicle control unit 40 opens the trunk of the vehicle according to the instruction, activates the second camera 52 installed in the trunk at the same time of opening the trunk, and closes the trunk after the deliveryman has placed the article into the trunk. The second camera 52 records the process of placing the article, and the vehicle control unit 40 sends the recorded video information to the mobile phone 11 of the recipient through the network communication module 30. When the video information of the second camera 52 shows that the article has been placed into the trunk and the trunk has been locked, the mobile phone 11 of the recipient sends signing information, which indicates that the article has been received, to the mobile phone 12 of the deliveryman.

Figure 3:
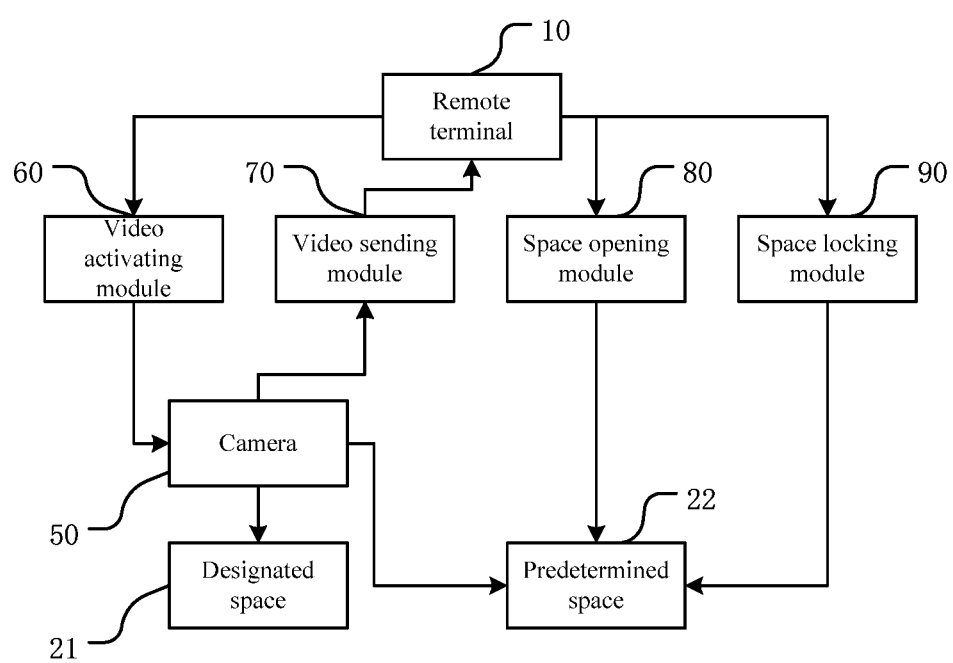
FIG. 3 is a schematic structural diagram of a receiving system for on-vehicle logistics according to one embodiment of the present invention.

FIG. 3 is a schematic structural diagram of a receiving system for on-vehicle logistics according to one embodiment of the present invention. The receiving system for on-vehicle logistics generally includes:

a video activating module 60 configured to receive a first control signal from a remote terminal 10 and activate a camera 50 pointing to a designated space 21;

a video sending module 70 configured to send video information of the designated space 21 to the remote terminal 10;

a space opening module 80 configured to receive a second control signal from the remote terminal 10 and open a predetermined space 22 of a vehicle; and a space locking module 90 configured to receive a third control signal from the remote terminal 10 and lock the predetermined space 22.

The working process of the receiving system is consistent with the working processes described in the aforementioned embodiments of the receiving method and the receiving device, and thus will not be repeated herein.

So far, those skilled in the art should be aware that, although a plurality of exemplary embodiments of the present invention have been shown and described herein in detail, many other variations or modifications conforming to the principle of the present invention can still be directly determined or derived according to the contents disclosed in the present invention without departing from the spirit and scope of the present invention. Therefore, the scope of the present invention should be understood and deemed as covering all of these other variations or modifications.

The invention claimed is:

1. A receiving method for on-vehicle logistics, comprising:

receiving a first control signal from a remote terminal, and activating a camera pointing to a designated space of a vehicle, wherein the designated space is a space that extends along a direction of the vehicle, and the camera is a first camera for scanning the surrounding of the vehicle to shoot video information of the designated space;

sending the video information of the designated space to the remote terminal, so that the remote terminal determines whether a deliveryman has arrived at the vehicle according to the video information of the designated space;

receiving a second control signal sent from the remote terminal after determining the deliveryman has arrived at the vehicle, and opening a predetermined space of the vehicle, wherein a second camera located in the predetermined space is activated with the opening of the predetermined space, shoots video information for recording the process of placing an article in the predetermined space and sends the video information to the remote terminal; and receiving a third control signal sent from the remote terminal after the remote terminal has determined that the article has been placed according to the video information from the second camera, and locking the predetermined space;

wherein a trunk of the vehicle has a first space close to an interior of the vehicle and a second space close to a tail of the vehicle, the first space and the second space are isolated from each other, and the predetermined space is the second space.

2. The receiving method of claim 1, wherein before the step of receiving the first control signal from the remote terminal, the receiving method further comprises:

receiving an acousto-optic control signal from the remote terminal to emit flicker and/or sound by the vehicle.

3. The receiving method of claim 2, wherein before the step of receiving the acousto-optic control signal from the remote terminal, the receiving method further comprises:

sending GPS positioning information of the vehicle to the remote terminal.

4. The receiving method of claim 1, further comprising:

automatically activating the camera according to searched positioning information of the deliveryman; and locking the predetermined space by an external close operation.

5. A receiving device for on-vehicle logistics, comprising:

a network communication module configured to communicate with a remote terminal through a wireless network;

a camera which is a first camera and is configured to be activated according to a first control signal from the remote terminal, scan the surrounding of a vehicle to shoot video information of a designated space of the vehicle, and send the video information to the remote terminal, so that the remote terminal determines whether a deliveryman has arrived at the vehicle according to the video information of the designated space, wherein the designated space is a space that extends along a direction of the vehicle;

a vehicle control unit configured to:

receive a second control signal from the remote terminal after determining the deliveryman has arrived at the vehicle and open a predetermined space of the vehicle, wherein a second camera located in the predetermined space is activated with the opening of the predetermined space, shoots video information for recording the process of placing an article in the predetermined space and sends the video information to the remote terminal; and receive a third control signal from the remote terminal after the remote terminal has determined that the article has been placed according to the video information from the second camera and lock the predetermined space;

wherein a trunk of the vehicle has a first space close to an interior of the vehicle and a second space close to a tail of the vehicle, the first space and the second space are isolated from each other, and the predetermined space is the second space.

6. A receiving system for on-vehicle logistics, comprising:

a video activating module configured to receive a first control signal from a remote terminal, and activate a camera pointing to a designated space of a vehicle, wherein the designated space is a space that extends along a direction of the vehicle, and the camera is a first camera for scanning the surrounding of the vehicle to shoot video information of the designated space;

a video sending module configured to send video information of the designated space to the remote terminal, so that the remote terminal determines whether a deliveryman has arrived at the vehicle according to the video information of the designated space;

a space opening module configured to receive a second control signal sent from the remote terminal after determining the deliveryman has arrived at the vehicle, and open a predetermined space of the vehicle, wherein a second camera located in the predetermined space is activated with the opening of the predetermined space, shoots video information for recording the process of placing an article in the predetermined space and sends the video information to the remote terminal; and a space locking module configured to receive a third control signal sent from the remote terminal after the remote terminal has determined that the article has been placed according to the video information from the second camera, and lock the predetermined space;

wherein a trunk of the vehicle has a first space close to an interior of the vehicle and a second space close to a tail of the vehicle, the first space and the second space are isolated from each other, and the predetermined space is the second space.

* * * * *